D. SAGER.
Corn Husker.
No. 79,011.
Patented June 16, 1868.
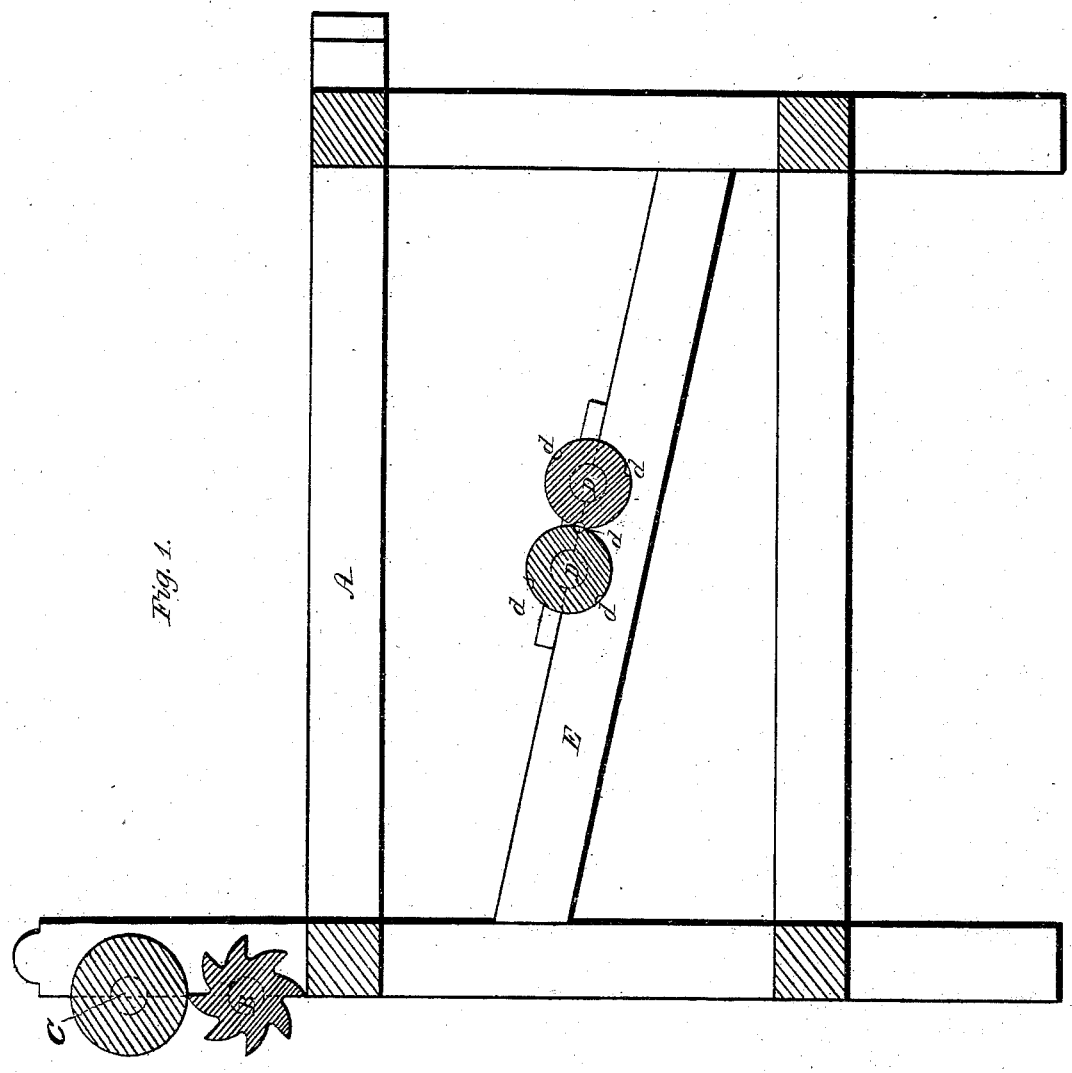
Witnesses.
J. M. Bokee
Wm. H. Low
Inventor.
Daniel Sager.

United States Patent Office.

DANIEL SAGER, OF NEW YORK, N. Y.

Letters Patent No. 79,011, dated June 16, 1868.

IMPROVEMENT IN CORN-HUSKING MACHINE.

*The Schedule referred to in these Letters Patent and making part of the same.*

TO ALL WHOM IT MAY CONCERN:

Be it known that I, DANIEL SAGER, of the city, county, and State of New York, have invented a new and useful Improvement on the Machine for Husking Corn, (for which Letters Patent of the United States were granted to me on the 2d day of July, 1867;) and I hereby declare the following to be a full and exact description of the same, reference being had to the accompanying drawings, making a part of this specification, in which—

Figure 1 is a longitudinal section of the machine, and

Figure 2 a plan view of the husking-roller.

My invention relates to the construction of the "picker" and the "husking-rollers," so as to give them a greater efficiency and certainty of action.

The following description will enable others skilled in the art to make and use my invention.

A is the frame; B, the "picker," made of metal, having a series of cutting-edges running in the direction of its length, which are formed on one side by straight radial lines, and on the other by curved lines drawn from the extreme point of one radial line to the base of the next one, where it meets the body of the picker. C, the picker-roller, of wood, placed directly over the picker, and held in contact with its cutting-edges. E E, the husking-rollers, made of metal, having a series of "quick" spiral grooves, $d\ d\ d$, cut in their surfaces. F, one of the side bearings for supporting the husking-rollers.

The operation of my invention is as follows:

The stalks of corn being passed between the picker B and the picker-roller C, the full curved surface of the cutting-edges operates after the manner of a wedge to force or break off the ears from the stalks, thereby preventing the ears from being drawn between the picker and its roller, thus avoiding the injury and breakage of the ears, so common to all pickers having straight-sided cutting-edges. The husking-rollers D D being driven at great speed in contrary directions, the grooves $d\ d\ d$ produce a vacuum whereby the loose fibres of the husks are drawn between the husking-rollers, giving them an immediate hold on the husks, whereby they are stripped instantly from the ears. These grooves, in addition to the effect mentioned, by indenting the surfaces, give a more secure hold upon pieces of stalk or other obstructions that are liable to get into the machine, thus securing their certain expulsion.

These grooves may be cut in a straight line in the direction of the length of the rollers, but I prefer them put in spirally. Their number may also be increased or diminished.

Among the advantages I claim for my invention are its certainty of action, its durability, and its freedom from liability to injure the ears of corn.

What I claim as my invention, and desire to secure by Letters Patent, is—

1. The picker B, when formed as herein described, and for the purposes specified.
2. The husking-rollers D D, with their grooves $d\ d\ d$, as and for the purposes set forth.

DANIEL SAGER.

Witnesses:
J. M. BOKEE,
WM. H. LOW.